US007955456B2

(12) United States Patent
Fischer et al.

(10) Patent No.: US 7,955,456 B2
(45) Date of Patent: Jun. 7, 2011

(54) METHOD FOR PRINTING A BLISTER FILM WEB IN A PACKAGING MACHINE

(75) Inventors: Jörg-Achim Fischer, Laboe (DE); Holger Suhr, Kiel (DE); Jörg Suhr, Rickert (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 105 days.

(21) Appl. No.: 12/423,838

(22) Filed: Apr. 15, 2009

(65) Prior Publication Data

US 2009/0260739 A1 Oct. 22, 2009

(30) Foreign Application Priority Data

Apr. 17, 2008 (DE) ......................... 10 2008 019 480

(51) Int. Cl.
*B32B 41/00* (2006.01)

(52) U.S. Cl. ........................... 156/64; 156/277; 156/297

(58) Field of Classification Search .................... 156/64, 156/366, 277, 297, 361, 378, 379; 101/227
See application file for complete search history.

(56) References Cited

U.S. PATENT DOCUMENTS 4,485,982 A * 12/1984 St. John et al. ............ 242/563.1
6,092,890 A * 7/2000 Wen et al. ..................... 347/101
6,164,200 A 12/2000 Mathea
2003/0230209 A1* 12/2003 Gonzalez et al. ............. 101/483
2005/0061419 A1* 3/2005 Send .............................. 156/64
2005/0155713 A1 7/2005 Mathea
2006/0000540 A1 1/2006 Mathea
2006/0098064 A1 5/2006 Noutary

FOREIGN PATENT DOCUMENTS

DE 19813859 A1 9/1999
DE 19850275 A1 5/2000
DE 10243084 B3 1/2004
DE 10312889 B3 8/2004
DE 60303680 T2 12/2006

OTHER PUBLICATIONS

German Search Report dated Jan. 12, 2009.

* cited by examiner

*Primary Examiner* — George R Koch, III
(74) *Attorney, Agent, or Firm* — Laurence A. Greenberg; Werner H. Stemer; Ralph E. Locher

(57) ABSTRACT

A method is disclosed for printing a blister film web in a packaging machine, in which molded blister shells are closed with blister film. In the method, a blister film web is supplied to a sealing apparatus via a first transport system, and molded blister shells are supplied to the sealing apparatus via a second transport system. The position of one of the molded blister shells is detected, and at least one detection signal is generated in one or more time intervals between the action time intervals of the sealing apparatus for closing the molded blister shells. A trigger signal for a printing device is generated in dependence on a detection, and optical information is applied to the blister film web by the printing device at a position along the blister film web which is arranged upstream of the sealing apparatus.

13 Claims, 2 Drawing Sheets

METHOD FOR PRINTING A BLISTER FILM WEB IN A PACKAGING MACHINE

CROSS-REFERENCE TO RELATED APPLICATION

This application claims the priority, under 35 U.S.C. §119, of German application DE 10 2008 019 480.8, filed Apr. 17, 2008; the prior application is herewith incorporated by reference in its entirety.

BACKGROUND OF THE INVENTION

Field of the Invention

The invention relates to a method for printing a blister film web in a packaging machine, in which molded blister shells are closed with blister film. The method includes the steps of: supplying the blister film web to a sealing apparatus via a first transport system; supplying the molded blister shells to the sealing apparatus via a second transport system; detecting a position of one of the molded blister shells; and generating a trigger signal for a printing device in dependence on a detection.

A large number of different goods or products are bound in blister packs and/or presented to a potential customer or user. For this purpose, a blister pack contains a molded blister shell, which has at least one shell-like, concave, dimensionally stable molding, in which one or more goods can be accommodated. Typically, familiar molded blister shells consist of a transparent or opaque plastics material. The molded blister shells provided with goods are closed with a blister film. Typically, familiar blister films have one or more layers, the materials used being polymers, papers, boards or metals, such as aluminum in particular. Particularly widespread is the packaging of medicines, for example tablets, sugar coated pills, or capsules, in blister packs. The blister film of these medicine packs is frequently provided with an imprint.

The largest proportion of such printed blister films, in particular in the form of webs, is currently provided with an imprint outside the actual packaging systems or packaging machines, in particular produced in flexographic presses. During the closure of the molded blister shells within a packaging machine, the problem then arises that the length of the prefabricated imprint on the blister film web does not always coincide exactly with the length of the molded blister shells, so that a stretching apparatus is necessary in order to pull the blister film to the requisite length before any connection with the molded blister shells.

As an alternative to this, it is also known to integrate a printing device in a packaging machine in order to provide an initially unprinted blister film web with an imprint before the former is supplied to closing molded blister shells. For instance, an arrangement of this type is disclosed in U.S. Pat. No. 6,164,200. In order to achieve correlation between the print on the blister film web and the supply of the molded blister shells to a sealing device in the form of a sealing roller, the printing device is activated by being triggered in dependence on the position of the molded blister shells supplied, detected by a sensor. In order to decouple the movement of the blister film web during the sealing operation from that during printing, a web store is also provided for the blister film web between the position of the printing device and the position of the sealing roller.

However, it has been shown in practice that the print is subjected to diverse influences within a packaging machine, which have a disruptive, in particular degrading, effect on the precision of the position of the print. For instance, speed changes or speed variations occur in the supply of the blister film and, respectively, the molded blister shells to the sealing apparatus, so that the time at which the trigger signal is generated is afflicted with errors. In addition, a web store causes additional inaccuracy. On top of everything, the actual length of a molded blister shell can exhibit a fluctuation, induced by production, in relation to an ideal theoretical length. In practice, it is therefore necessary to take further measures in order to increase the precision of the position of the print on the blister film.

SUMMARY OF THE INVENTION

It is accordingly an object of the invention to provide a method for printing a blister film web in a packaging machine which overcomes the above-mentioned disadvantages of the prior art methods of this general type, which reduces disruptive influences, in particular induced mechanically, on the precision of the position of the print on the blister film relative to the molded blister shell.

The method according to the invention for printing a blister film web in a packaging machine, in which molded blister shells are closed with blister film, contains the now described steps. The blister film web is supplied to a sealing apparatus by a first transport system. The molded blister shells are supplied to the sealing apparatus by a second transport system. At least one position of one of the molded blister shells is detected, preferably by a sensor which can in particular measure optically or acoustically. At least one detection signal is generated in one or more time intervals between the action time intervals of the sealing apparatus for closing the molded blister shells. A trigger signal for a printing device is generated in dependence on the detection. Optical information, in particular a printed image or an imprint, is applied to the blister film web by the printing device at a position along the blister film web which is arranged upstream of the sealing apparatus.

According to the invention, a detection signal is advantageously generated in time slots during which few or quantitatively low speed changes occur, so that more accurate generation of the trigger signal is possible. This can be done in particular by the detection position, for example therefore the position of the sensor, being chosen in such a way that a molded blister shell passes the position when only few or quantitatively low speed changes occur. In this way, as an advantageous consequence, a precise targeted print on the blister film can be achieved with the printing device in the packaging machine. In other words, the imprint on the blister film web supplied to the sealing apparatus can be synchronized or correlated (in particular with the same phase) with the supply of the molded blister shells. The start of the printed image is generated in such a way that the influence of mechanical faults in the feed system is minimized.

The packaging machine can in particular be a medicine packaging machine, for example for tablets, sugar coated pills or capsules. The packaging machine can also be designated a blister machine. The printing can be carried out on one side or two sides of the blister film web. Widespread is a single-sided print on the subsequent outer side of the blister film of the blister pack. The sealing apparatus can operate intermittently and/or cyclically. The closure of the molded blister shells can be carried out in particular by fusion joining or adhesive bonding. The printing device can be a digital printing device, so that the imprinting can be carried out variably, in particular both in terms of its content and image size or shape. In other words, the length and/or position with an imprint produced with a digital printing device can be controlled freely. The printing device can in particular also print the blister film web without contact. In particular, a molded blister shell which is transported to the sealing apparatus by the second transport device can be detected before the sealing apparatus. The sensor can be a reflective light barrier. The generation of the trigger signal can be carried out in particular by using a threshold method. The molded blister shells can be supplied to the sealing apparatus by the second transport device linked to one another or joined to one another in the form of a web. Alternatively, in a group of embodiments, individual molded blister shells can also be supplied to the sealing apparatus. For the purpose of closing a molded blister shell with a piece of blister film, a section can be severed from the blister film web before the sealing apparatus. Alternatively, the end of the blister film web can first be joined to the end of the web of linked molded blister shells in the sealing apparatus, and then closed molded blister shells can be severed from the web. The blister film web can in particular consist of a material mentioned at the beginning, for example have an aluminum layer. The optical information can in particular be visible or visual.

Particularly preferably, the printing device in the method according to the invention is an inkjet printing system. In particular, the inkjet printing system can have one or more modules of drop-on-demand inkjet printing devices (droplet expulsion inkjet printing device). In other words, the use of an inkjet printing system is preferred. The inkjet printing devices can have a plurality of outlet nozzles which, in particular, can be arranged in lines. The inkjet printing system can preferably have a resolution of greater than 600 dpi (dots per inch), in particular for example 720 dpi. The inkjet printing system can be configured to be as wide as the entire width of the blister film web to be printed.

In a development of this preferred embodiment, ink that can be dried with ultraviolet radiation is used, and the ink printed on a section of the blister film web by the inkjet printing system is dried before the section reaches the sealing apparatus. In particular, the packaging machine can have a UV dryer for this purpose, which is arranged downstream of the printing device along the path of the blister film web through the packaging machine.

The method according to the invention can contain the additional step that, by using the sealing apparatus, action is taken on a molded blister shell and on a section of the blister film web in such a way that the molded blister shell is joined to the section of the blister film web in order to close the molded blister shell. For this purpose, a molded blister shell and a section of the blister film web can be pressed on to each other, for example in order to carry out or to assist adhesive bonding.

In an advantageous embodiment of the method, the distance along the path of the second transport device from the position of the detected molded blister shell to the position of the sealing apparatus is substantially equal to the distance along the blister film web from the position at which the printing device prints the blister film web to the position of the sealing apparatus. In this way, a situation is created in which measurement and activation of the printing device are carried out without any dead time, i.e. without delay, in such a way that the current printing is carried out on that section of the blister film web which, in the sealing apparatus, is joined to the molded blister shell which has currently been detected. As an advantageous consequence, therefore, individual variations or fluctuations in the length of the molded blister shells supplied can be taken into account for the printing. It is clear to those skilled in the art that the same objective can also be achieved if the distance along the path of the second transport device from the position of the detected molded blister shell to the position of the sealing apparatus is greater than the distance along the blister film web from the position at which the printing device prints the blister film web to the position of the sealing apparatus. However, detection then takes place at a time which lies before the envisaged print starting time, so that the time difference occurring between these two times has to be taken into account in the activation of the printing device. The time difference can be determined in an elementary way by those skilled in the art from the supply speed and the path differences.

In a group of practical embodiments of packaging machines, a dancer roller system for movement decoupling is arranged in the packaging machine between the position at which the printing device prints the blister film web and the position of the sealing apparatus along the blister film web. The method according to the invention can also be carried out in such embodiments of packaging machines. For these embodiments, the now described additional method steps are preferably provided. The movement of the dancer roller system is detected. The change in the distance of the position of the printing device from the sealing apparatus along the blister film web is determined from the movement detected. A time or the time of the trigger signal for the printing device is corrected in dependence on the distance change determined.

In an advantageous development of the method according to the invention, errors are advantageously eliminated with the aid of one or more averages. A sequence of time difference values from successive detection signals is processed, in particular also stored. From at least some of the time difference values, an average is calculated, for example the arithmetic average. Finally, the printing device is actuated with the trigger signal generated on the basis of the calculated average.

The method according to the invention can be used in particular for molded blister shells which in each case have a plurality of shell-like moldings to accommodate goods. Examples from the medicine pack sector for this purpose are blister packs for tablets, coated pills or capsules. In other words, in a group of embodiments of the method according to the invention, molded blister shells each having a plurality of shell-like moldings to accommodate goods and detection of the positions of a plurality of the shell-like moldings can be used.

In this group of embodiments of the method, first a trigger signal can be generated from each detection event of the shell-like moldings of the molded blister shell. Second, the detection events of the positions of a plurality of shell-like moldings can be counted and a trigger signal can be generated when a predefined limiting value is exceeded, in particular only when the latter is exceeded, otherwise not. The limiting value can be, for example, a predefined maximum number. As an alternative to this, the frequency of the detection events or of the time interval between individual detection events can be determined, and a trigger signal can be generated when a predefined limiting value is exceeded. The limiting value can be a predefined minimum frequency or a predefined maximum time interval. The aforementioned exceeding can, for example, consist in a current value being greater than a limiting value while, in the case of a value below the limiting value, no trigger signal generation is carried out, or in a current value being smaller than a limiting value while, in the case of a value above the limiting value, no trigger signal generation is carried out.

In a further development of the method according to the invention, explicitly as an alternative to the detection of a position of one of the molded blister shells, the imprint produced by the printing device on the blister film web is also registered by a camera, in particular after the sealing apparatus. After the closure of the molded blister shells, the image registered is analyzed and a trigger pulse for the printing device is generated in dependence on the analytical result. In this way, deviations in the position of the imprint on the molded blister shells can likewise be detected, so that the printing device can be synchronized with the position of the molded blister shells.

In specific further developments of the method according to the invention, provision is made to use a clock disk fitted to a sealing roller of the sealing apparatus as a detector for a position of a molded blister shell.

For those skilled in the art addressed by this illustration, it is immediately and unambiguously clear that the features listed, on their own and in feature groupings combined therefrom, are hereby disclosed and can be provided in methods according to the invention. In particular, it must not be concluded from the order of the illustration of individual features that the features named first must necessarily be present in a specific feature combination.

Other features which are considered as characteristic for the invention are set forth in the appended claims.

Although the invention is illustrated and described herein as embodied in a method for printing a blister film web in a packaging machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
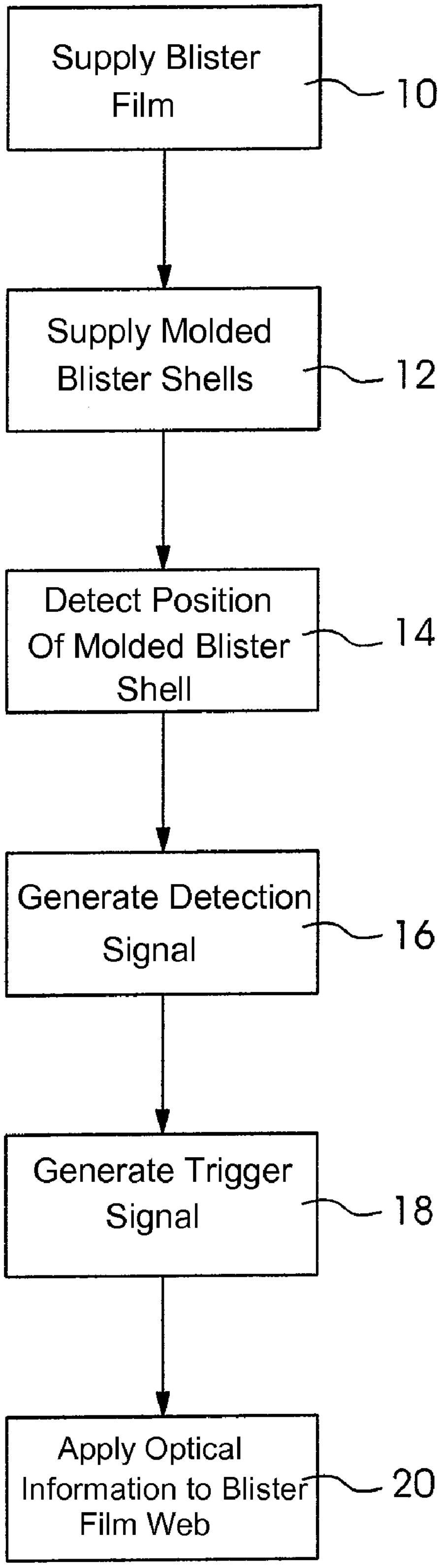
FIG. 1 is a flow chart of the method according to the invention.

Referring now to the figures of the drawing in detail and first, particularly, to FIG. 1 thereof, there is shown a flow chart of a method according to the invention for printing a blister film web in a packaging machine. Molded blister shells are closed with blister film. According to the invention, for this purpose a series of individual operations is carried out, which at least to some extent can also be carried out with an at least partial time overlap or simultaneously. In a first step 10, the blister film web is supplied to a sealing apparatus by a first transport system. In a second step 12, molded blister shells are supplied to the sealing apparatus by a second transport system. In a third step 14, a position of one of the molded blister shells is detected. In a fourth step 16, at least one detection signal is generated in one or more time intervals between the action time intervals of the sealing apparatus for closing the molded blister shells, so that in a fifth step 18, a trigger signal for a printing device is generated in dependence on the detection. Finally, in a sixth step 20, optical information is applied to the blister film web by the printing device at a position along the blister film web which is upstream of the sealing apparatus.

In the method according to the invention, a plurality or all of the molded blister shells supplied can be detected, so that in each case at least one trigger signal per molded blister shell can be generated for a plurality or all of the molded blister shells.

Figure 2:
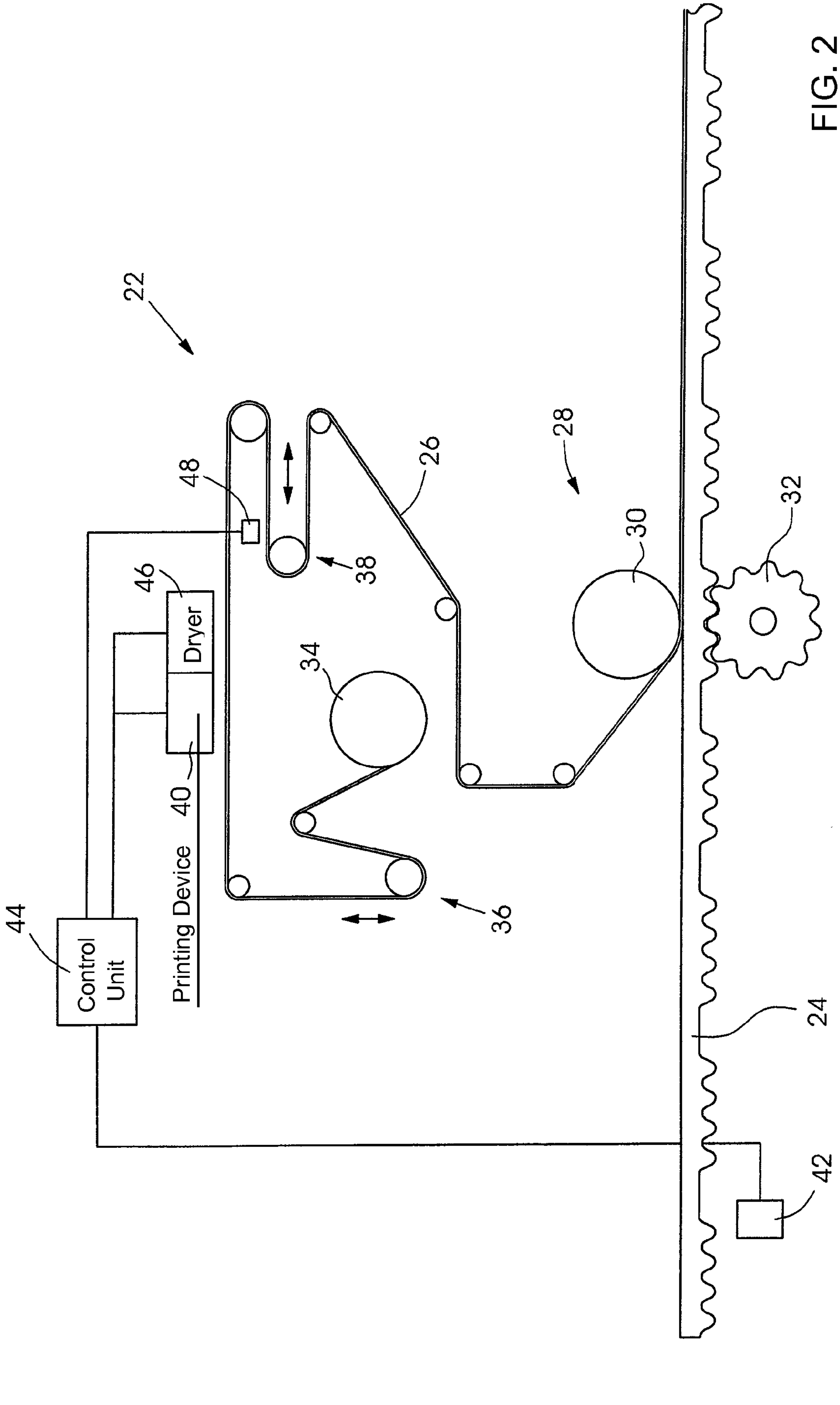
FIG. 2 is a schematic illustration of an embodiment of a pack printing machine which is set up such that a preferred embodiment of the method according to the invention can be carried out.

FIG. 2 is a schematic illustration of an embodiment of a pack printing machine which is set up such that a preferred embodiment of the method according to the invention can be carried out. In the pack printing machine 22, here a medicine packaging machine, molded blister shells 24 are closed with a blister shell. The molded blister shells 24 are formed by sections of a web. The blister film is processed in the packaging machine 22 as a blister film web 26. Molded blister shells 24 and the blister film web 26 are supplied to a sealing apparatus 28, which contains a sealing roller 30 and a back-pressure roller 32. As a result of the action of the sealing apparatus 28, in practical terms by using the action of mechanical force of the sealing roller 30, the blister film web 26 is joined to the molded blister shells 24. The initially unprinted blister film web 26 is unwound from a roll (unwind 34). The movement of the blister film web 26 is carried out by a drive belonging to the sealing roller 30 and a further drive of the unwind 34. Along the path through the packaging machine 22, over various web guide rollers, the blister film web 26 first passes a first dancer system 36 having a movable dancer roller (movement indicated by a double arrow). There exists a web section running substantially horizontally before a second dancer system 38 having a movable dancer roller (movement likewise indicated by a double arrow), in which the blister film web 26 is provided by a printing device 40 with an imprint on the side located on the outside following the subsequent closure of the molded blister shells 24.

In practical terms, in this preferred embodiment the printing device 40 is a monochromatic inkjet printing system which is based on drop-on-demand technology. It contains a plurality of inkjet printing modules which each have a plurality of outlet nozzles that can be activated individually. It is possible for a resolution of more than 600 dpi to be reached. The printing device 40, more practically the outlet nozzles, are arranged such that a print as wide as the side can be made on the blister film web 26 (in the lateral direction at right angles to the transport direction) without changing the position of the printing device 40.

By a sensor 42, the molded blister shell 24 is detected, so that a detector signal can be supplied to a control unit 44. The presence or position of a molded blister shell 24 for which an imprint is to be produced for the section of the blister film web 26 is detected. The activation of the printing device 40, in particular for the purpose of triggering the start of printing, is carried out by a trigger pulse which is generated in the control unit 44. Provision is made for it to be possible also to delay the trigger signal with respect to the detector signal in the control unit 44. In principle, provision is made for an arrangement of the sensor 42 to be chosen in such a way that its distance from the sealing roller 30 along the path of molded blister shells 24 is greater than or equal to the distance of the printing device 40 from the sealing roller 30 along the blister film web 26, so that that molded blister shell 24 is detected for the generation of the trigger signal for the imprint on the section of the blister film web 26 which is also closed with the section. In general, however, a series of trigger signals is generated in dependence on the registration or the detection of the series of molded blister shells 24. Under the assumption that the scatter of the length of the molded blister shells 24 lies within a tolerable interval, detection can also take place at a position whose distance from the sealing roller 30 along the web of molded blister shells 24 is smaller than the distance of the printing device 40 from the sealing roller 30 along the blister film web 26, so that a print start is triggered by a molded blister shell 24 to be closed by a previously printed section of the blister film web 26.

According to the invention, as described, the printing is carried out in a manner correlated with a section of the blister film web 26 which is used for the closure of a molded blister shell 24.

The integration of the printing system 40 into the pack printing machine 22 requires adequately good mechanical decoupling of the printing system 40 from the pack printing machine 22. In a configuration as shown in FIG. 2, measurements of the speed of the blister film web 26 at the position of the sealing roller 30 exhibit speed changes of large amplitudes occurring at regular time intervals, which are caused by the clocked or periodic mode of operation of the sealing apparatus. According to the invention, this influence degrading the precision of the method is reduced or even eliminated by the sensor detecting the molded blister shells at a location spaced apart at a suitable distance from the sealing roller, so that a detector signal is generated when only a few or quantitatively low speed changes occur outside the action interval. In other words, the detection takes place in a correlated manner, in particular in anti-phase, in relation to the periodic operation of the sealing apparatus, in such a way that influences interfering with the detection and reducing the precision are avoided.

Arranged immediately downstream of the printing device 40 along the path of the blister film web 26 through the packaging machine 40 there is a UV dryer 46 which, in this embodiment, has a UV lamp, so that a UV-curable ink is dried by the action of radiation before contact is made with the blister film web 26 on the printed side by web guiding elements, as a result of which contact there is the risk of degradation of the imprint.

Furthermore, in the embodiment shown, a measuring device 48 is used to detect the movement of the first dancer roller system 36, so that a change in the distance of the position of the printing device 40 from the sealing apparatus 28 along the blister film web 26 on account of the change in the length of the web section stored in the dancer roller system 36 can be determined from the movement detected, and the time of the trigger signal for the printing device 40 can be corrected as a function of the distance change determined.

The invention claimed is:

1. A method for printing a blister film web in a packaging machine, in which molded blister shells are closed with blister film, which comprises the steps of:
- supplying the blister film web to a sealing apparatus via a first transport system;
- supplying the molded blister shells to the sealing apparatus via a second transport system;
- detecting a position of one of the molded blister shells, the detecting taking place in a correlated manner, the correlated manner being in anti-phase in relation to a periodic operation of the sealing apparatus for avoiding influences interfering with detection and reduction of precision;
- generating a trigger signal for a printing device in dependence on a detection;
- applying optical information to the blister film web via the printing device at a position along the blister film web which is disposed upstream of the sealing apparatus; and
- generating at least one detection signal in at least one time interval between action time intervals of the sealing apparatus for closing the molded blister shells.

2. The method according to claim 1, which further comprises providing an inkjet printing system as the printing device.

3. The method according to claim 2, which further comprises using ink that can be dried with ultraviolet radiation and drying the ink printed on to a section of the blister film web by the inkjet printing system, before the section reaches the sealing apparatus.

4. The method according to claim 1, which further comprises acting with the sealing apparatus on a molded blister shell and on a section of the blister film web such that the molded blister shell is joined to the section of the blister film web to close the molded blister shell.

5. The method according to claim 1, which further comprises setting a distance along a path of the second transport device from a position of the detected molded blister shell to a position of the sealing apparatus to be substantially equal to or greater than a distance along the blister film web from a position at which the printing device prints the blister film web to the position of the sealing apparatus.

6. The method according to claim 1, which further comprises:
- disposing a dancer roller system for movement decoupling in the packaging machine between a position at which the printing device prints the blister film web and a position of the sealing apparatus along the blister film web;
- detecting a movement of the dancer roller system;
- determining a change in a distance of the position of the printing device from the sealing apparatus along the blister film web from movement detected; and
- correcting a time of the trigger signal for the printing device in dependence on a distance change determined.

7. The method according to claim 1, which further comprises:
- processing a sequence of time difference values from successive detection signals; and
- calculating an average from at least some of the time difference values and actuating the printing device with the trigger signal generated on a basis of a calculated average.

8. The method according to claim 1, which further comprises:
- using the molded blister shells which in each case have a plurality of shell-like moldings to accommodate goods; and
- detecting positions of a plurality of the shell-like moldings.

9. The method according to claim 8, which further comprises generating the trigger signal from each detection event of the shell-like moldings of the molded blister shell.

10. The method according to claim 8, which further comprises counting the detection events of the positions of a plurality of the shell-like moldings and generating the trigger signal when a predefined limiting value is exceeded.

11. The method according to claim 8, which further comprises determining a frequency of the detection events or of a time interval between individual detection events and generating the trigger signal when a predefined limiting value is exceeded.

12. The method according to claim 1, which further comprises:
- registering an imprint produced by the printing device on the blister film web by a camera; and analyzing an image registered and generating a trigger pulse for the printing device in dependence on an analytical result.

13. The method according to claim 1, which further comprises using a clock disk fitted to a sealing roller of the sealing apparatus as a detector for a position of a molded blister shell.

* * * * *